Nov. 22, 1955 — H. ZIEBOLZ — 2,724,397
JET PIPE REGULATORS
Filed Oct. 14, 1950 — 3 Sheets-Sheet 1
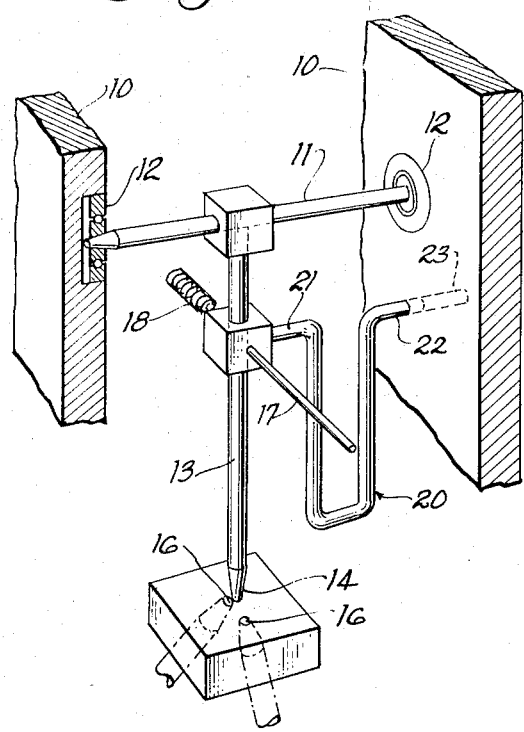
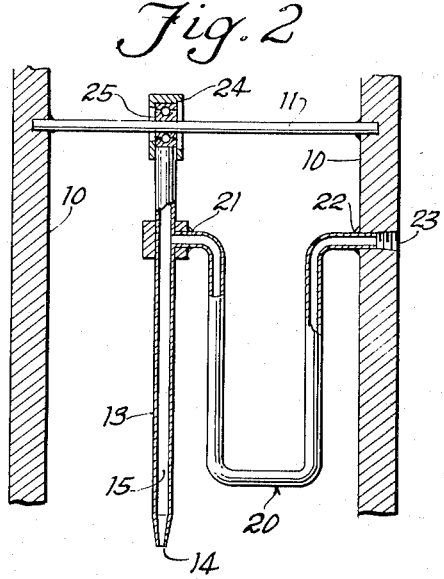
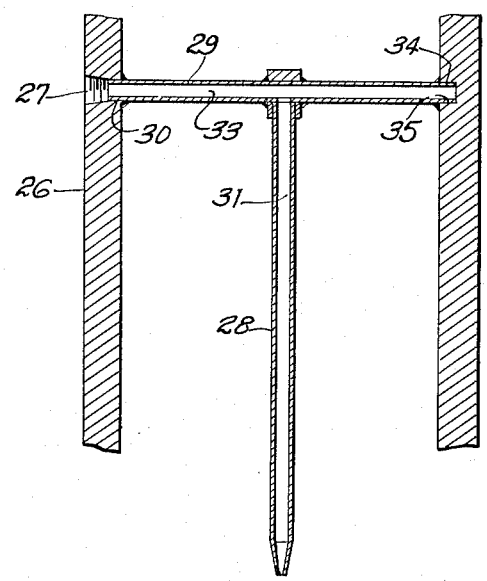
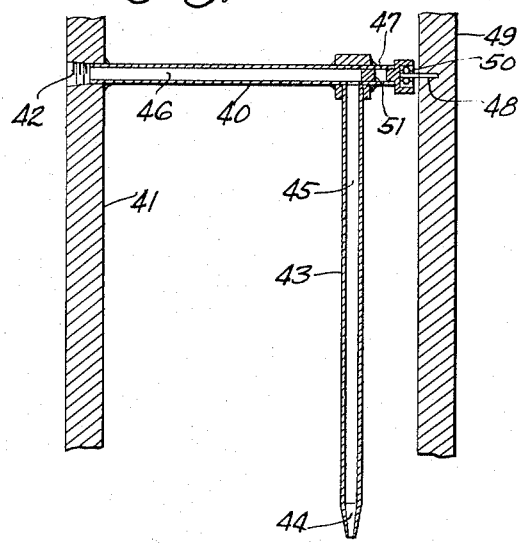
INVENTOR.
Herbert Ziebolz

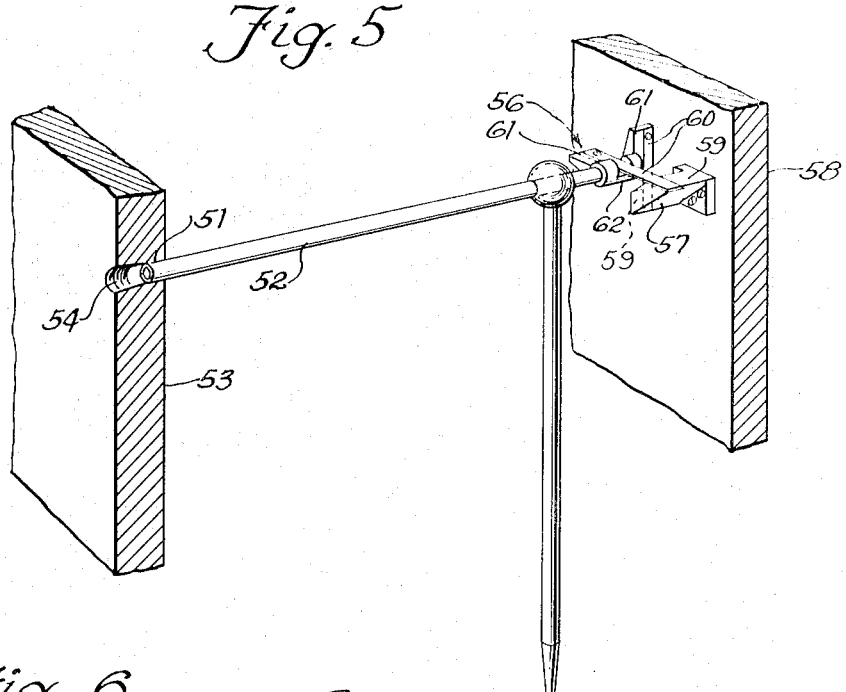
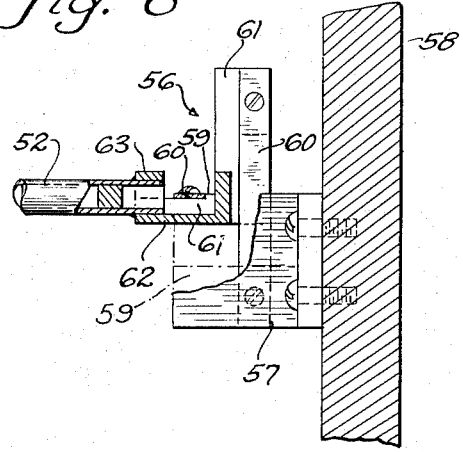
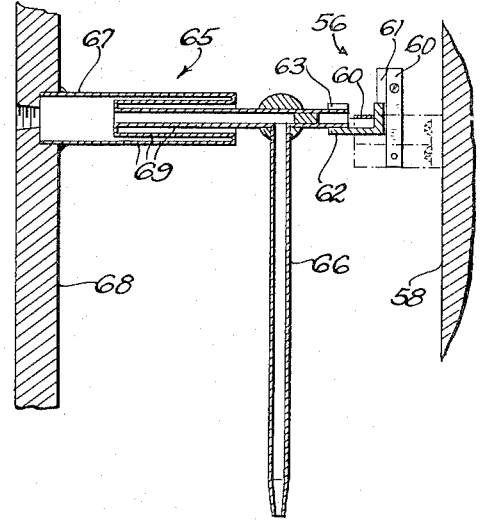

Nov. 22, 1955     H. ZIEBOLZ     2,724,397
JET PIPE REGULATORS
Filed Oct. 14, 1950     3 Sheets-Sheet 3
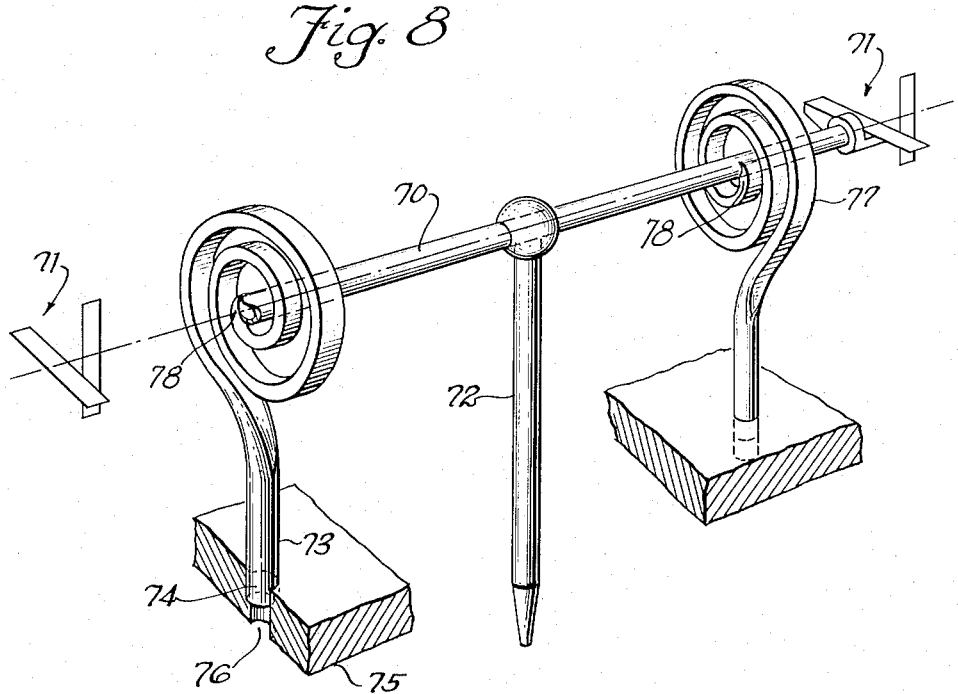
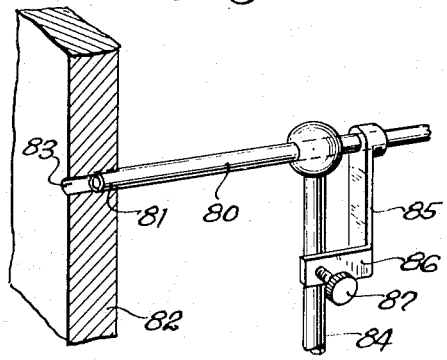
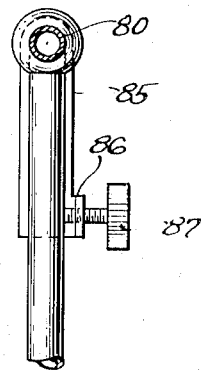
INVENTOR.
Herbert Ziebolz

United States Patent Office 2,724,397
Patented Nov. 22, 1955

2,724,397

JET PIPE REGULATORS

Herbert Ziebolz, Chicago, Ill., assignor to Askania Regulator Company, Chicago, Ill., a corporation of Illinois Application October 14, 1950, Serial No. 190,130

9 Claims. (Cl. 137—83)

The present invention relates to jet pipe relay regulators and more particularly to the movable assemblies of such regulators. A movable assembly of the kind in question comprises a jet pipe having in its end an orifice for discharging axially of the pipe a jet of fluid under pressure directed in the direction of a receiver port. The jet pipe is mounted for swinging about a fixed pivot axis to select the degree of registration of its orifice with the receiver port in response to a signal applied to position the jet pipe, thereby to determine the magnitude of pressure developed in the receiver port by the magnitude of the applied signal.

An important problem in jet pipe practice has been the delivery of fluid under pressure from a fixed supply line to the swingable jet pipe assembly. The difficulty of the problem arises from the requirement of highly sensitive and accurately proportional positional response by the jet pipe to changes in signal magnitude, making the use of friction packing joints undesirable. To avoid excessive pressure loss and escape of fluid at the joint between the relatively movable supply and jet pipe assembly lines and at the same time to avoid use of friction packings, very close clearances of relatively movable parts of fluid-transfer joint assemblies have been employed. A somewhat similar problem is presented by arrangement of suspension means for pivotally supporting the movable jet pipe assembly, capable of strictly limiting movement of the jet pipe discharge orifice to swinging along a fixed and predetermined path wherein the receiver port lies, and which is arcuately disposed about a rigidly fixed and preselected pivot axis. Such rigid fixing of the jet pipe discharge orifice path is necessary for accurate relation of the regulator response to signal magnitude alone, since deflection of the discharge orifice from such path injects an error variation in the degree of registration of the jet pipe orifice with the receiver port.

For highly sensitive and accurate positional jet pipe response to signals in ranges of relatively small magnitudes, the jet pipe suspension means should exert as little resistance as is practical to jet pipe displacement, and such resistance as is unavoidable should be predictable and regular. For these reasons flexure suspension devices are desirable, such devices comprising flexible elements disposed axially between and rigidly secured to the swinging jet pipe assembly and the fixed structure that mounts it, and being deformable by torque when a signal is imposed on the movable assembly to swing the jet pipe. Such devices, because they are frictionless, have highly regular and predictable characteristics of resistance to swinging of the movable assembly supported by them, and in this respect are superior to bearing assemblies having relatively movable parts respectively secured to the fixed and swingable assemblies. They are inferior to the latter, however, in that they are very much more subject to lateral deflection permitting the jet pipe orifice to vary from its preselected arcuate path about the preselected pivot axis.

It has become conventional practice, for sensitivity to signals of small magnitudes, to suspend the movable jet pipe assembly by a system presenting as little resistance as practical to jet pipe swinging, and to bias the jet pipe of such an assembly to a preselected zero position by springs having force-exerting and resistance characteristics selected in accordance with the particular range of signal magnitudes to be used in the particular installation. As signal magnitudes increase, and heavier bias springs are used, larger forces are exerted on the movable jet pipe assemblies, tending to disturb the high sensitivity bearings and deflect the jet pipe from the path in which it must be maintained for accuracy of regulator response to signal magnitude. Such deflection also tends to disturb the normal positional relation between the relatively movable parts of the fluid-conducting joint between the fixed supply line and the movable jet pipe fluid line, introducing unavoidable, unpredictable frictional resistance to jet pipe swinging. Such disturbance effects are particularly troublesome in installations provided with flexure type suspensions.

A primary object of the invention is the provision of a novel type of connection for supplying to a swinging jet pipe assembly fluid under pressure for discharge through the jet pipe discharge orifice.

Another primary object is the provision of such a type of connection that does not inject into the system a tendency to disturb the pivot axis about which the jet pipe is intended to swing.

Another object is the provision of a novel swingable jet pipe assembly particularly suited to employment in operating conditions involving application of signal forces in magnitude ranges tending to overcome the resistance of high sensitivity suspension systems to deflection of the swinging assembly from its preselected pivot axis.

An additional object is the provision of a novel jet pipe, fluid supply, suspension and zero bias assembly.

A further object is the provision of a novel suspension for the swinging assembly of a jet pipe regulator, providing a novel system for biasing the jet pipe of such assembly to a preselected position without disturbance of the axis of assembly swinging from a preselected disposition.

In the accompanying drawings:

Fig. 1 is a perspective view, partially in section, showing a jet pipe regulator assembly and disclosing one general type of arrangement embodying the invention.

Fig. 2 is a section on the pivot axis of the swinging assembly of a slightly modified form of jet pipe assembly including the same supply arrangement as shown in Fig. 1.

Fig. 3 is a section on the pivot axis of a jet pipe regulator assembly disclosing one form of a second general type of arrangement embodying the invention.

Fig. 4 is a section similar to Fig. 3 showing a second specific form of the general type of arrangement shown by Fig. 3.

Fig. 5 is a perspective view, partially in section of a third specific form of the general arrangement type of Figs. 3 and 4.

Fig. 6 is a fragmentary median longitudinal section showing details of the flexure suspension of Fig. 5.

Fig. 7 is a section on the pivot axis of a highly specialized form of the type of arrangement disclosed by Fig. 3.

Fig. 8 is a perspective view of a modified form of the invention.

Fig. 9 is a fragmentary perspective view of a jet pipe swinging assembly provided with a novel jet pipe zero positioning device adapted to cooperate with such a swinging assembly that is suspended in accordance with the invention.

Fig. 10 is a transverse section showing in end elevation the arrangement of Fig. 9.

A primary concept of the invention is arrangement of the swinging assembly of a jet pipe regulator for supply of pressure fluid from a fixed supply line to the swinging jet pipe through a sealed path provided by means sufficiently flexible to accommodate itself to jet pipe swinging, and so disposed and arranged as to avoid disturbance of the axis of jet pipe swing from its preselected position, and to avoid interfering with accurate positional response of the swinging jet pipe to magnitude of a signal applied to position it. In accordance with the invention, such supply is accomplished by means of a tubular conduit that is rigidly connected at its opposite ends to the swingable jet pipe and to rigidly fixed structure than forms the fluid supply line. This tubular conduit is distortable by signal force applied to swing the jet pipe about its pivot axis, and thus accommodates itself to signal-responsive swinging of the jet pipe. The tubular conduit may take a variety of forms, the most important requirement being that its arrangement be such as to exert as nearly as is practical a proportional and repeatable resistance to swinging of the jet pipe, and to limit so far as is practical the effect of such tubular conduit tending to deflect the swing path of the jet pipe from its intended location. As a refinement of the invention the tube is made of resilient material and is arranged to act of itself as a resilient bias member or return device for storing energy as the jet pipe is swung by a signal away from its zero position and releasing such energy to move the jet pipe toward its zero position when the signal magnitude is reduced.

Referring to Fig. 1, a jet pipe regulator is shown as comprising a housing structure including spaced sidewalls 10 between which a jet pipe spindle or shaft 11 is pivotally suspended, in this form of the invention by bearing 12 that rigidly fix the pivot axis of the shaft. Bearings 12 are shown as conventional ball bearing assemblies. A jet pipe 13 is mounted on spindle 11 from which it projects radially. The jet pipe has an axial discharge orifice 14 at its end that is disposed to discharge fluid from the internal passage of the jet pipe in the direction of two receiver ports 16 that are associated with the housing in one of a variety of known ways. By swinging of jet pipe 13 and spindle 11 the relative degrees of registration of discharge orifice 14 with receiver ports 16, the pressures developed within them by fluid received from the jet pipe, and pressure differential between them, all are controlled by the angular position of the jet pipe about its pivot axis. A suitable differential pressure device coupled with the receiver ports constitutes a relay output. When no signal is applied to the jet pipe it occupies a preselected neutral or zero position, normally in equal registration with the receiver ports, so no pressure differential exists between the latter. The ports 16 are spaced in the direction of movement of the jet pipe discharge orifice about the pivot axis of spindle 11.

In Fig. 1 the signal and zero biasing system is shown as being of conventional form, comprising a thrust signal rod 17 having an end disposed to deliver force to jet pipe 13 along a line that is a chord of the arcuate swing path of orifice 14. A return spring 18 is disposed on the opposite side of the jet pipe from rod 17, to resist jet pipe swinging by signal force exerted through the rod, proportion the angular deflection of the jet pipe from its zero position to magnitude of the signal force, and to return the jet pipe toward its zero position when the signal force diminishes.

In accordance with the invention, and as distinguished from the conventional prior practice of delivering pressurized fluid to an internal passage of the jet pipe 13 through a bore in spindle 11 connected with a supply line by a swivel joint, fluid is supplied to the jet pipe of Fig. 1 through a distortable tube having its ends connected by sealed joints with the stationary supply line structure and the swingable jet pipe. In Fig. 1 this tube is an auxiliary supply tube designated 20, and has one end 21 secured to jet pipe 13 at a location radially spaced from spindle 11, while its second end 22 is rigidly secured to structure providing a fixed supply line, shown as housing wall 10 wherein is provided a supply passage 23, tube end 22 being secured to the wall structure in surrounding relation to the outlet of passage 23.

Tube 20 is distortable between its ends by swinging of the jet pipe under the influence of signal force applied to it through rod 17, and is arranged both to be in a neutral or undistorted condition when jet pipe 13 is in its zero position, and to resist swinging of the jet pipe from zero position in accordance with a regular and linear functional relation to degree of such deflection. While a wide variety of practical arrangements of tube 20 is possible, the tube is shown as being generally U-shaped, with relatively long side reaches disposed parallel to jet pipe 13 and to be spaced therefrom along a common radius when the jet pipe is in its zero position. The elongate character of tube 20 gives it a certain degree of flexibility suiting it to the type of service in question.

In Fig. 2 the support element 11 is shown as having its ends rigidly supported in walls 10, and the jet pipe is mounted for swinging about the axis of element 11 by a supporting block 24 rotatably supported on the element by a bearing device 25.

Figs. 3 to 7 disclose a second general, very highly practical type of arrangement of the invention. This type of arrangement includes a tubular spindle secured rigidly to a fixed support in surrounding relation to the outlet of a supply passage in the support, the jet pipe being mounted on the tubular spindle in spaced relation to the support and the spindle wall being circumferentially distortable by torque exerted thereon as an incident to swinging of the jet pipe. While a conventional zeroing bias system, such as that of Fig. 1, may be used, preferably the tubular spindle itself has resilience characteristics that enable it of itself to act as a zero biasing device, in addition to acting as a pivot support and fluid supply line for the jet pipe. At its end opposite its connection with the fixed supporting structure the tubular spindle advantageously is suspended to maintain its axis in coincidence with the preselected jet pipe pivot axis. Since the rigid mounting of the tubular spindle of itself provides a high resistance to lateral deflection of the assembly from its intended pivot axis, a great variety of suspension devices may be employed at the second spindle end, and thus may be chosen from standpoints of regular and predictable resistance to jet pipe swinging rather than from standpoints of maintenance of the pivot axis in a fixed disposition.

In the specific arrangement of Fig. 3, one supporting or housing wall structure 26 is provided with a supply passage 27 having an outlet opening through its interior surface. An axially straight, cylindrical tubular element 29 serves as a pivot support for jet pipe 28, having one of its ends 30 rigidly secured to structure 26 in surrounding relation to the outlet of passage 27, and extending from the structure to the location of the jet pipe in concentric surrounding relation to the preselected pivot axis about which the jet pipe is to swing. Jet pipe 28 is mounted on tubular element 29 in radially projecting relation thereto and with its internal passage 31 and axial discharge orifice in communication with supply passage 27 through the internal passage 33 of tubular element 29. The mounting for the second end 34 of the tubular element 29 is shown as comprising a socket 35 in a second housing wall structure 36, within which the tube end 34 is rigidly secured. While this tube end might be rotatable in socket 35, such a bearing would introduce friction, which tends to exert an irregular resistance to rotative movement of the tube end.

The circumferential position of the assembly of the jet pipe and tubular spindle element is such that the latter is undistorted when the jet pipe occupies its zero position. When a signal is applied and swings the jet pipe from its zero position, the tubular element wall between the jet pipe and the end 30 that is sealed to wall structure 26 about the supply passage outlet is circumferentially distorted or twisted by the torque that is developed and exerted on the reach of tubular element supporting the jet pipe as an incident of the swinging of the latter.

Advantageously tubular element 29 is made of resilient material, so that its resistance to such circumferential wall distortion serves to proportion degree of jet pipe deflection from zero position to magnitude of a signal applied to deflect it, and also to store return force in the element wall for biasing the jet pipe to its zero position.

Under conditions of varying temperature, expansion and contraction of a tubular spindle element mounted rigidly at both ends between parts of a housing structure may result in change of the characteristic of resistance of the element wall to circumferential distortion and thereby disturb the response characteristic of a regulator so arranged. Consequently, instead of being rigidly secured to the second wall the second end of the tubular element may be supported by a suspension device that will accommodate limited relative axial movement of the tube end and the structure supporting it. Such type of support additionally may permit rotative movement of the second end of the tubular spindle with swinging of the jet pipe, so that such swinging is resisted only by the single reach of the tubular spindle between the jet pipe and the end that is attached to the support surrounding the supply passage outlet.

In Fig. 4, the tubular jet pipe-supporting element 40 is fixed to the first supporting wall 41 in surrounding relation to the outlet of supply passage 42. The jet pipe 43 is secured to tubular element 40 as in Fig. 3, with its orifice 44 in communication with the supply passage 42 through the internal passages 45, 46 of the jet pipe and tubular element. At its second end 47, tubular element 40 is provided with a pivot bearing comprising a stud 48 mounted in the second supporting wall 49 in axial alignment with tubular element 40 and engaging a ball bearing assembly 50 fixed in the second end 47 of the latter. A plug 51 is mounted in the bore of element 40 between the jet pipe and second end 47. It will be seen that this type of suspension for the second end of the tubular spindle element affords both alignment and freedom of axial and rotative movement to the second tubular element end.

One advantage of the torque tube spindle type of jet pipe suspension described above, especially valuable when resilience of the tubular spindle element affords a zeroing bias to the jet pipe, is that the rigid support of the first tube end on the supporting structure surrounding the outlet of the fixed supply passage tends to maintain the tubular element properly centered on the preselected jet pipe pivoting axis. This permits employment for support of the second end of the tubular element of a flexure type of suspension device, which is advantageous because of its characteristic lack of frictional resistance to relative turning of two elements that it connects.

There are numerous kinds and arrangements of flexure suspension devices, the one shown in Figs. 5 and 6 having been selected for disclosure purposes. As in the assemblies of Figs. 3 and 4, the first end 51 of a tubular jet pipe supporting spindle or element 52 is rigidly secured to a first supporting wall 53 in surrounding relation to the outlet of a supply passage 54 that is centered on the preselected axis of jet pipe pivotal movement. The flexure suspension device 56 comprises a support 57 that projects from the supporting structure 58 to one side of the jet pipe pivot axis and that has a pair of surfaces 59 that are angularly related to each other and that lie along planes that cross at the pivot axis. To surfaces 59 are secured corresponding ends of flexible strips 60, the other ends of which are secured to surfaces of arms 61 that are angularly related similar to surfaces 59. Arms 61 form parts of a cradle structure 62 that includes a collar 63 in which the end of jet pipe spindle 52 is engaged. When a torque is applied to spindle 52, the strips 60 flex, permitting turning of the spindle. Due to absence of relatively moving contacting surfaces, the device is free of frictional resistance, and its characteristic of resistance to torque is very regular and predictable.

Fig. 7 discloses a form of torque tube jet pipe suspension element that is specialized to provide a relatively great circumferential flexibility between a jet pipe that it supports and an end rigidly secured to supporting structure. This element, designated 65, between the point of attachment of the jet pipe 66 and the end 67 of the element that is secured to a supporting wall 68, comprises plural telescoped, concentric and radially spaced subelements 69, the successive ones of which are secured together at alternate ends. Torque exerted at the point of attachment of the jet pipe as an incident to deflection of the latter results in a distribution of circumferential wall distortion throughout the cumulative length of the subelements 69, and resistance to jet pipe deflection thereby is rendered much less than in a cylindrical continuous element of the same length. The second end of element 65 is shown supported by the same type of flexure suspension device as shown in Fig. 5, and the same reference numerals are applied to it.

Another type of arrangement, making use of a sealed, flexible tube for supplying fluid to a jet pipe, and cooperating with flexure type suspension assemblies is disclosed by Fig. 8. In this arrangement a tubular jet pipe spindle 70 is mounted at each end by a flexure suspension assembly, shown schematically and designated 71. The tubular spindle 70 is sealed at its ends. Fluid is supplied to its interior and to the jet pipe 72 through a helical or spiral supply tube 73 that has one end 74 rigidly secured to a wall structure 75 through which opens a supply passage 76 that communicates with the tube end 74. A second tube 77 having the same characteristic of resistance to distortion, and coiled in the opposite sense to tube 73 is also mounted on wall structure 75, both tubes having their second ends 78 secured to spindle element 70, and supply tube 73 having its internal passage in communication with the internal passage of spindle element 70 to connect the discharge orifice of jet pipe 72 with supply passage 76.

It will be evident that some difficulty may be experienced in so mounting a jet pipe assembly wherein resilience of the fluid supply tube is relied upon for zeroing bias, that the jet pipe orifice exactly coincides with its intended zero position when the resilient supply tube is undistorted. Figs. 9 and 10 disclose a means for adjusting the angular position of a jet pipe orifice in its swing path about the jet pipe pivot axis, without resort to auxiliary bias springs and without distorting the resilient supply tube that is relied upon to return the jet pipe orifice to its zero position by return of the tube to its own undistorted condition. The arrangement is shown as applied to a jet pipe suspension arrangement of the general type of Figs. 3 to 7, but is applicable to any suspension wherein supply tube resilience is employed for zero biasing. In Fig. 9 the tubular jet pipe supporting and supply element 80 has its end 81 rigidly secured to supporting wall 82 in surrounding relation to the outlet of a supply passage 83. Adjacent, but axially spaced in the direction of the second end of element 80 from the jet pipe 84 is a radial arm 85 securely mounted on element 80. Arm 85 carries a structure 86 that extends alongside the jet pipe and carries a thrust device, shown as a screw 87 threaded through it, for deflecting the jet pipe between its point of attachment to element 80 and its orificed end, and in the direction of intended swing path of the jet pipe discharge orifice. By such means, after the jet pipe assembly has been mounted to the supporting structure an exact adjustment may be made of the zero position of the jet pipe discharge orifice without in any way disturbing the condition of the fluid supply tube between its points of attachment to the supporting structure and to the jet pipe.

While numerous specific embodiments of the invention have been disclosed, it is evident that many other forms and arrangements may be adopted to practice the invention. Therefore the scope of the invention is to

I claim:

1. In a relay regulator that comprises a jet pipe having a discharge orifice and an internal passage communicating with said orifice for discharging a stream of fluid in a direction determined by the angular position of said jet pipe about a pivot axis, a supporting base structure and means mounted on said structure and supporting said jet pipe for swinging about a fixed pivot axis; an elongate tubular element, means rigidly connecting a first portion of said tubular element to said base structure, said element having at least a second portion spaced from said first portion and that is longitudinally straight and disposed symmetrical about said fixed pivot axis, and means rigidly connecting said second element portion with said jet pipe and positioning the latter substantially at right angles to said fixed pivot axis, the wall of said second tubular element portion being peripherally distortable to accommodate swinging of said jet pipe about said fixed pivot axis.

2. In a relay regulator that comprises a jet pipe having a discharge orifice and an internal passage communicating with said orifice for discharging a stream of fluid in a direction determined by the angular position of said jet pipe about a pivot axis, supporting base structure provided with a discharge opening for delivery of fluid under pressure, and means mounted on said structure and supporting said jet pipe for swinging about a fixed pivot axis; a tube, means rigidly connecting a first end of said tube to said structure and providing sealed communication between its interior and said opening, second means connecting the second end of said tube to a side of said jet pipe between said fixed pivot axis and jet pipe orifice, said second connecting means providing sealed communication between said tube interior and jet pipe internal passage, said tube having an offset rebent portion between its said ends and being distortable to permit its said second end to swing with said jet pipe and relative to its said first end.

3. In a relay regulator that comprises a jet pipe having a discharge orifice and an internal passage communicating with said orifice for discharging a stream of fluid in a direction determined by the angular position of said jet pipe about a pivot axis, supporting base structure provided with a discharge opening for delivery of fliud under pressure, and an elongate member mounted on said structure and supporting said jet pipe in laterally projecting relation to said member and for swinging about a fixed pivot axis; a tube, means rigidly connecting a first end of said tube with said structure and providing sealed communication between its interior and said opening, said tube having a longitudinally straight portion adjacent its second end, and an intermediate U-shaped portion offset laterally from said straight portion, second means rigidly connecting said straight portion to a side of said jet pipe between said elongate member and jet pipe orifice and maintaining said portion with its axis disposed substantially in the directions of jet pipe swing, said jet pipe having a lateral aperture and said second connecting means providing sealed communication between the interior of said tube portion and aperture, and said rebent tube portion permitting distortion of said tube to permit said straight portion to swing with said jet pipe.

4. A relay regulator comprising receiver structure having a port for development of pressure by impingement of a stream of fluid upon its opening, a jet pipe having an internal passage and an orifice for discharging a stream of fluid delivered through said passage, a supporting base structure, and means supporting said jet pipe upon said base structure for swinging about a fixed pivot axis to move said orifice in a fixed path into greater and lesser degrees of registration with said port and from a preselected limit position of minimum registration therewith to increase degree thereof, said means including a tubular element having a first portion fixed to said base structure and connected with a fluid supply passage and a second portion spaced from said first portion, and means rigidly connecting said second portion to said jet pipe in laterally extended relation thereto, the interior of said element being in communication with said jet pipe passage, and said element being resiliently distortable between its said portions to permit swinging of said jet pipe and being substantially undistorted while the jet pipe is in its said neutral position.

5. A relay regulator comprising receiver structure having a pair of narrowly spaced ports for development of pressures by impingement of a stream of fluid upon their openings, a jet pipe having an internal passage and an orifice for discharging a stream of fluid delivered through said passage, a supporting base structure, and means supporting said jet pipe upon said base structure and providing for delivery of fluid to it, said means being arranged to permit said jet pipe to swing about a fixed pivot axis to move said orifice in a fixed path along the common diametric plane of said port openings and from a neutral position with its axis midway between their axes in opposite directions respectively to increase degree of its registration with the different ports in opposite senses, said means including a tubular element having a first portion rigidly fixed to said base structure and connected with a fluid supply passage and a second portion spaced from said first portion, and means rigidly connecting said second portion to said jet pipe in laterally extended relation thereto and with its interior in communication with said jet pipe passage, and said element being resilient and distortable between said portions to permit swinging of said jet pipe and being substantially undistorted while said jet pipe is in its said neutral position.

6. A relay regulator according to claim 5, wherein said element is cylindrical, symmetrically disposed about said fixed pivot axis, and its wall is circumferentially distortable.

7. A relay regulator in accordance with claim 5, wherein said element is disposed upon a radius of said jet pipe.

8. A relay regulator according to claim 5, wherein said second element portion is disposed upon a radius of said jet pipe.

9. A relay regulator according to claim 5, wherein said second element portion is disposed upon a chord of said jet pipe.

References Cited in the file of this patent

UNITED STATES PATENTS

| | | |
|---|---|---|
| 368,733 | Ryan | Aug. 23, 1887 |
| 1,086,751 | Brown | Feb. 10, 1914 |
| 1,544,706 | Wallen | July 7, 1925 |
| 1,693,885 | Butterworth | Dec. 4, 1928 |
| 1,724,147 | Russell | Aug. 13, 1929 |
| 1,727,962 | Buskard | Sept. 10, 1929 |
| 2,011,120 | Searle | Aug. 13, 1935 |
| 2,039,768 | Bird | May 5, 1936 |
| 2,128,682 | Von Manteuffel | Aug. 30, 1938 |
| 2,365,755 | Griffith | Dec. 26, 1944 |
| 2,511,969 | Chapin | June 20, 1950 |
| 2,541,695 | Gangewere | Feb. 13, 1951 |

FOREIGN PATENTS

| | | |
|---|---|---|
| 691,035 | Germany | May 15, 1940 |